United States Patent [19]

Chromecek et al.

[11] Patent Number: 5,126,309
[45] Date of Patent: Jun. 30, 1992

[54] DECONTAMINATION OF TOXIC CHEMICAL AGENTS

[75] Inventors: Richard C. Chromecek, Litchfield, Conn.; John C. McMahon, New Windsor; Milan F. Sojka, Walden, both of N.Y.

[73] Assignee: Dow Corning Corporation, Midland, Mich.

[21] Appl. No.: 548,526

[22] Filed: Jul. 5, 1990

Related U.S. Application Data

[62] Division of Ser. No. 352,591, May 15, 1989.

[51] Int. Cl.$^5$ ............................................. B01J 20/26
[52] U.S. Cl. ........................ 502/402; 252/186.1; 252/190
[58] Field of Search .................... 502/402; 252/186.1, 252/190

[56] References Cited

U.S. PATENT DOCUMENTS

| 3,387,061 | 6/1968 | Smith | 428/290 |
| 4,201,822 | 5/1980 | Cowsar | 428/245 |
| 4,421,664 | 12/1983 | Andersen | 252/174.13 |
| 4,690,825 | 9/1987 | Won | 424/501 |
| 4,725,378 | 2/1988 | Krawczak | 252/174.13 |
| 4,762,637 | 8/1988 | Aronson | 252/186.36 |
| 4,784,699 | 11/1988 | Cowsar | 134/42 |
| 4,797,221 | 1/1989 | Crieldenzopf | 252/186.36 |
| 4,850,729 | 7/1989 | Kramer | 252/106 |
| 4,863,632 | 9/1989 | Aronson | 252/186.36 |

FOREIGN PATENT DOCUMENTS

0252463 1/1988 European Pat. Off.
1028596 2/1986 Japan.

Primary Examiner—Patrick P. Garvin
Assistant Examiner—E. D. Irzinski
Attorney, Agent, or Firm—Roger E. Gobrogge; Jim L. DeCesare

[57] ABSTRACT

A process of decontaminating a surface contaminated with a toxic chemical agent in which there is applied to the contaminated surface, a macroporous cross-linked hydrophobic copolymer containing an agent which is a decontaminant for the toxic chemical agent present on the surface. The decontaminant can be a chemical neutralizer such as sodium hydroxide; lithium hydroxide; concentrated bleach; and mixtures of diethylene triamine, 2-methoxy ethanol, and sodium hydroxide, for example.

5 Claims, 6 Drawing Sheets

1000 X
0 RPM
⊢——⊣ 10 μm

FIG. 7

1000 X
75 RPM
⊢——⊣ 10 μm

FIG.8

1000 X
150 RPM
|—| 10 μm

FIG.9

1000 X
300 RPM
|—| 10 μm

DECONTAMINATION OF TOXIC CHEMICAL AGENTS

This is a divisional of copending application Ser. No. 07/352,591 filed on May 15, 1989.

BACKGROUND OF THE INVENTION

This invention relates to the decontamination of toxic chemical agents in which a decontaminating agent is entrapped within a macroporous cross-linked copolymer. The copolymer is a powder which is a complex structure consisting of unit particles, agglomerates, and aggregates.

The concept of producing spheres or beads by means of suspension polymerization techniques is well known in the prior art. An exemplary one of such processes is disclosed in U.S. Pat. No. 2,809,943, issued Oct. 15, 1957. However, it was found that when a material was added which is a solvent for the monomers, but acts as a precipitant for the resulting polymer, a novel form of bead was provided containing a network of microscopic channels. This discovery is set forth in U.S. Pat. No. 4,224,415, filed Jul. 18, 1958, issuing some twenty-two years later on Sep. 23, 1980. In this patent, beads are produced ranging in size from about 350 to about 1200 microns. Typical monomers include divinyl toluene, diallyl maleate, and triallyl phosphate. The precipitant employed is an alkane, acid ester, or alcohol.

This technology was expanded and the precipitant was variously described in the patent literature as a diluent, porogen, active ingredient, solvent, functional material, and volatile agent. For example, in U.S. Re. Pat. No. 27,026, issued Jan. 12, 1971, porous beads of a diameter less than ten microns are disclosed. Among the monomers used to produce the beads are ethyl methacrylate, divinyl benzene, and ethylene glycol dimethacrylate. In U.S. Pat. No. 3,418,262, issued Dec. 24, 1968, there is described a bead characterized as having a rigid sponge structure, and wherein the porogenic agent employed is an acid such as stearic acid. Intermediates in bead form were produced in U.S. Pat. No. 3,509,078, issued Apr. 28, 1970, using polymeric materials such as polyethylene glycols as the precipitant material during the in situ suspension polymerization process. The macroporous character of such bead construction is graphically portrayed and illustrated in FIG. 1 of U.S. Pat. No. 3,627,708, issued Dec. 14, 1971. Beads termed "pearls" are produced, and containing active ingredients therein such as water or various alcohol ethers. The pearls are crosslinked to the extent of about twenty percent. In U.S. Pat. No. 3,637,535, issued Jan. 25, 1972, beads with a sponge structure are said to be capable of being compressed to an imperceptible powder. These beads are capable of being loaded with as much as 200–300% of active ingredients such as white spirit, and benzin. A rigid porous bead of a trifunctional methacrylate is taught in U.S. Pat. No. 3,767,600, issued Oct. 23, 1973. Such beads have a size of 10–900 microns, and various other monomers which can be employed include diacetone acrylamide, and ethylhexyl, hydroxyethyl, and hydroxypropyl methacrylates. Paraffin wax in an amount of 5–100% is used to form the microscopic network of channels in U.S. Pat. No. 3,989,649, issued Nov. 2, 1976. The wax may be removed from the bead structure by solvent extraction.

While many of the foregoing U.S. patents relate to ion exchange technology, a bead similar to those previously described is employed as a carrier for enzymes in U.S. Pat. No. 4,208,309, issued Jun. 17, 1980. Such beads are of the size of about 0.1 mm. U.S. Pat. No. 4,661,327, issued Apr. 28, 1987, describes a macroreticular bead containing a magnetic core. The use of hard crosslinked porous polymeric beads in cosmetics as carriers is taught in U.S. Pat. No. 4,724,240, issued Feb. 9, 1988, wherein various emollients and moisturizers are entrapped therein. These beads are said to be capable of entrapping materials such as 2-ethylhexyl oxystearate, arachidyl propionate, petroleum jelly, mineral oil, lanolin, and various siloxanes. The size of the beads ranges from 1–3,000 microns. Typical monomers include ethylene glycol dimethacrylate, lauryl methacrylate, trimethylol propane trimethacrylate, and dipentaerythritol dimethacrylate. "In situ" hydrophobic powders and "in situ" beads may be produced in accordance with the teaching of this patent. Beads having a rigid sponge structure are also described in U.S. Pat. No. 4,690,825, issued Sep. 1, 1987, and wherein the beads function as a delivery vehicle for a host of materials including pigments, vitamins, fragrances, drugs, repellants, detergents, and sunscreens. The beads have a size of 10–100 microns and are preferably of a monomer system of styrene-divinyl benzene. Crosslinking is said to range from 10–40 percent. U.S. Pat. No. 4,806,360, issued Feb. 21, 1989, describes a post adsorbent bead which contains a melanin pigment for use as a sunscreen.

The foreign patent literature includes West German Offenlegungsschrift No. P-2608533.6, published Sep. 30, 1976, and wherein porous polymeric beads produced by "in situ" suspension polymerization are provided, and which are adapted to release perfumes. A controlled release of the fragrance is disclosed, providing utility for such beads in the home, automobiles, airplanes, railway cars, hospitals, classrooms, conference centers, and gymnasiums. Canadian Patent No. 1,168,157, issued May 29, 1984, describes hard, discrete, free flowing, bead constructions in which the beads entrap a series of functional materials which can be incorporated into toilet soap, body powder, and antiperspirant sticks. The Canadian Patent, it is noted, is the equivalent of European Patent No. 61,701, issued on Jul. 16, 1986, both of which are foreign equivalents of the parent case of the '240 patent. In European International Publication No. 0252463A2, published Jan. 13, 1988, there is disclosed a bead having a hydrophobic polymer lattice, and which entraps numerous non-cosmetic materials such as pesticides, pharmaceuticals, pheromones, and various categories of chemicals. Steroids are entrapped, for example, in the porous beads of PCT International Publication No. WO-88/01164, published on Feb. 25, 1988. The steroids are adrenocortical steroids or various anti-inflammatory type steroids. It should therefore be apparent that what began as a simple ion exchange bead concept has rapidly grown into a technology of widely varied application.

In accordance with the present invention, copolymer powders are produced by novel processes not believed to be taught in the prior art, as exemplified by the foregoing patents. Those patents, in general, relate to suspension polymerization processes for the production of porous polymeric and copolymeric spheres and beads in which the precipitant is present during polymerization. These are defined as an "in situ" process. For example, U.S. Pat. No. 4,724,240, discloses beads and spheres produced by "in situ" suspension polymerization techniques. The PCT International Publication, while a suspension polymerization system, can also be defined as a "post adsorption" process in its use. In this variance, a volatile porogen is included which may be removed by extraction and evaporation, resulting in empty beads. The beads can be loaded with diverse active ingredients, as desired, at subsequent times. A similar process is disclosed in U.S. Pat. No. 4,806,360. "Post adsorption" techniques are more attractive because of the flexibility in the selection of active ingredients that can be subsequently entrapped, whereas in the conventional "in situ" systems, the porogen polymerized "in situ" remains in the final product.

Thus, according to the prior art, hydrophobic cross-linked porous copolymers in particle form can be produced by at least three distinct processes. One process produces beads by "in situ" suspension polymerization, and this process is shown in Example 4 of the '240 patent, and in U.S. Pat. No. 4,690,825. Another process produces beads by suspension polymerization but the beads are "post adsorbed" with an active ingredient after the volatile porogen is removed. This process is shown in U.S. Pat. No. 4,806,360, and in the PCT International Publication. In a third process, powders are produced by "in situ" precipitation polymerization, and this process is shown in Examples 1-3 of the '240 patent.

What has been accomplished in accordance with the present invention, however, is a unique concept differing from all of the foregoing methods, and wherein post adsorbent powders are produced and employed in a novel fashion in decontaminating surfaces contaminated with toxic chemical agents. Toxic chemical agents are chemical substances in gaseous, liquid, or solid form, intended to produce casualty effects ranging from harassment to incapacitation to death. Some particular effects produced by such toxic chemical agents can be choking, blood poisoning, lacrimation, nerve poisoning, laxation, and various forms of mental and physical disorganization and disorientation. In the event that decontamination cannot be properly handled by natural processes such as wind, rain, dew, sunlight, heat and actinic rays from the sun, some form of chemical decontamination must be employed.

Typical of the prior art systems for decontamination are the use of powders such as carbon, fuller's earth, bentonite, and other polymer systems; and solutions of bleach, various solvents, and various emulsions, which are sprayed or wiped over the contaminated surfaces with an applicator. Such methods suffer from the disadvantage that the solutions are corrosive and in many cases toxic. Further, there is a need for water which is not always convenient. These prior art techniques are generally not suited for indoor use on interiors, and are difficult to employ in low temperature regions of the country. The powders are also ineffective against toxic chemical agents when the agents are in their thickened form.

Thus, it should be apparent that there exists a need for a radically different and effective decontaminating agent for decontaminating various surfaces subject to toxic chemical agent contamination. The present invention fulfils such a need and provides a new decontaminating system which has a reduced toxic effect, does not depend on the use of water in order to function, and is capable of use at low temperatures. While cellular polymeric materials are not new to chemical warfare as indicated in U.S. Pat. No. 4,708,869, issued Nov. 24, 1987, the porous copolymeric powders of the present invention are employed to function as a vehicle for the decontaminating agent rather than for the toxic chemical agent as in the '869 patent.

SUMMARY OF THE INVENTION

This invention relates to a process of decontaminating a surface contaminated with a toxic chemical agent in which there is applied to the contaminated surface, a macroporous cross-linked hydrophobic copolymer containing an agent which is a decontaminant for the toxic chemical agent present on the surface. The decontaminant can be a chemical neutralizer such as sodium hydroxide; lithium hydroxide; concentrated or supertropical bleach; mixtures of diethylene triamine, 2-methoxy ethanol, and sodium hydroxide; and other solvents or emulsion based mixtures.

One monomer of the copolymer is a monounsaturated monomer such as lauryl methacrylate, and the other monomer of the copolymer is a polyunsaturated monomer such as ethylene glycol dimethacrylate. The copolymer can also be formed using only polyunsaturated monomers. The copolymer is in the form of a powder and the powder is a combined system of particles. The system of powder particles includes unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter.

The invention also relates to an adsorbent for decontaminating toxic chemical agents in which a macroporous cross-linked hydrophobic copolymer is produced by precipitation polymerization in a solvent of at least one monounsaturated monomer and at least one polyunsaturated monomer soluble therein, or only polyunsaturated monomers, and a decontaminating agent is entrapped within the copolymer.

Further, the invention relates to a process of removing toxic chemical agents from a surface contaminated with the toxic chemical agent in which there is applied to the contaminated surface, a macroporous cross-linked hydrophobic copolymer, adsorbing the toxic chemical agent into the copolymer, and removing the copolymer along with the adsorbed toxic chemical agent from the contaminated surface.

A precipitation polymerization process is used for producing the macroporous cross-linked copolymer. In the process, there is copolymerized at least one monounsaturated monomer and at least one polyunsaturated monomer in the presence of an organic liquid which is a solvent for the monomers but not for the copolymer. The process can also be conducted using only polyunsaturated monomers. The copolymerization of the monomers is initiated by means of a free radical generating catalytic compound, precipitating a copolymer in the solvent in the form of a powder. A dry powder is formed by removing the solvent from the precipitated copolymeric powder.

Several suitable monomers are disclosed in U.S. Pat. No. 4,724,240. The monounsaturated monomer can also be vinyl pyrrolidone, diacetone acrylamide, or 2-phenoxyethyl methacrylate. The polyunsaturated monomer can be ethylene glycol dimethacrylate or tetraethylene glycol dimethacrylate. The solvent is preferably isopropyl alcohol, although ethanol, toluene, heptane, and cyclohexane, may also be employed.

The monounsaturated monomer and the polyunsaturated monomer can be present in mol ratios of, for example, 20:80, 30:70, 40:60, or 50:50. The process may include the step of stirring the monomers, solvent, and the free radical generating catalytic compound, during copolymerization. Preferably, the dry powder is formed by filtering excess solvent from the precipitated powder, and the filtered powder is vacuum dried. The powder may then be "post adsorbed" with various decontaminating materials.

The powders of the present invention may also be used as carriers or adsorbents for materials such as water, aqueous systems, emollients, moisturizers, fragrances, dyes, pigments, flavors, drugs such as ibuprofen, phosphoric acid, insect repellents, vitamins, sunscreens, detergents, cosmetics, pesticides, pheromones, herbicides, steroids, sweeteners, pharmaceuticals, and antimicrobial agents. Finely divided solids such as analgesic materials can be adsorbed by dissolving the finely divided analgesic in a solvent, mixing the analgesic and solvent with the powder, and removing the solvent. Other post adsorbable materials include alkanes, alcohols, acid esters, silicones, glycols, organic acids, waxes, and alcohol ethers.

These and other objects, features, and advantages, of the present invention will become apparent when considered in light of the following detailed description, including the accompanying drawings.

In the above figures in the drawing, the magnification is indicated in each instance. For example, the magnification in FIGS. 6-9 is 1000X, and 2000X in FIG. 10. FIGS. 6-10 also include an insert identifying a length approximating ten microns for comparative purposes.

It should be pointed out, that in viewing the various figures, one will note that as the rate of stirring is increased from zero rpm up to eight hundred rpm, that the size of the unit particles increase. This is in direct opposition to what has been traditionally observed in suspension polymerization systems, wherein increases in stirring rates decrease particle size. Because of the increased size of the unit particles shown in FIG. 10 and the resulting decrease in surface area, the adsorptive capacity of these large particles is less than the adsorptive capacity of the smaller sized particles shown in FIGS. 6-9.

The most effective unit particles can be produced if the rate of stirring is maintained below about three hundred rpm, although particles produced at rates beyond three hundred rpm are useful and adsorptive, but to a lesser extent.

DETAILED DESCRIPTION OF THE INVENTION

The material of the present invention, can be broadly and generally described as a crosslinked copolymer capable of entrapping solids, liquids, and gases. The copolymer is in particulate form and constitutes free flowing discrete solid particles even when loaded with an active material. When loaded, it may contain a predetermined quantity of the active material. One copolymer of the invention has the structural formula:

where the ratio of x to y is 80:20, R' is $-CH_2CH_2-$, and R'' is $-(CH_2)_{11}CH_3$.

The copolymer is a highly crosslinked copolymer, as evidenced by the foregoing structural formula, and is more particularly a highly crosslinked polymethacrylate copolymer. This material is manufactured by the Dow Corning Corporation, Midland, Mich., U.S.A., and sold under the trademark POLYTRAP®. It is a low density, highly porous, free-flowing white particulate, and the particles are capable of adsorbing high levels of lipophilic liquids and some hydrophilic liquids, while at the same time maintaining a free-flowing particulate character.

In the powder form, the structure of the particulate is complex, and consists of unit particles less than one micron in average diameter. The unit particles are fused into agglomerates of twenty to eighty microns in average diameter. These agglomerates are loosely clustered into macro-particles termed aggregates of about 200 to about 1200 microns in average diameter.

Adsorption of actives to form "post adsorbed" powder, can be accomplished using a stainless steel mixing bowl and a spoon, wherein the active ingredient is added to the empty dry powder, and the spoon is used to gently fold the active into the powder. Low viscosity fluids may be adsorbed by addition of the fluids to a sealable vessel containing the powder and tumbling the materials until a consistency is achieved. More elaborate blending equipment such as ribbon or twin cone blenders can also be employed.

The following example illustrates the method for making a post adsorbent powder, of the type illustrated in FIGS. 1-3 and 6-10.

EXAMPLE I

A hydrophobic porous copolymer was produced by the precipitation polymerization technique by mixing in a five hundred milliliter polymerization reactor equipped with a paddle type stirrer, 13.63 grams of ethylene glycol dimethacrylate monomer, or eighty mole percent, and 4.37 grams of lauryl methacrylate monomer, or twenty mole percent. Isopropyl alcohol was added to the reactor as the solvent in the amount of 282 grams. The monomers were soluble in the solvent, but not the precipitated copolymer. U.S. Pat. No. 4,724,240 lists other monomers which may also be employed. The process can be conducted with only polyunsaturated monomers if desired. Other solvents that can be employed are ethanol, toluene, cyclohexane, or heptane. The mixture including monomers, solvent, and 0.36 grams of catalytic initiator benzoyl peroxide, was purged with nitrogen. The system was heated by a water bath to about sixty degrees Centigrade until copolymerization was initiated, at which time, the temperature was increased to about 70–75 degrees Centigrade for six hours, in order to complete the copolymerization. During this time, the copolymer precipitated from the solution. The copolymerization produced unit particles of a diameter less than about one micron. Some of the unit particles adhered together providing agglomerates of the order of magnitude of about twenty to eighty microns in diameter. Some of the agglomerates adhered further and were fused and welded one to another, forming aggregates of loosely held assemblies of agglomerates of the order of magnitude of about two to eight hundred microns in diameter. The mixture was filtered to remove excess solvent, and a wet powder cake was tray dried in a vacuum oven. A dry hydrophobic copolymeric powder consisting of unit particles, agglomerates, and aggregates was isolated.

The adsorptive capacity of the hydrophobic particulates produced in Example I, as a function of the stirring rate, was determined. The stirring rate during the reaction in Example I significantly influences the adsorption properties of the particulate materials. The adsorptivity of the particulate materials decreases with an increase in stirring rate, and the density of the particulates increases. These results are tabulated and set forth in Tables I–III.

TABLE I

| Agitation Rate (RPM) | Bulk Density Size (g/cc) | Aggregate Size (μ) | Agglomerate Size (μ) | Unit Particle Size (μ) | Adsorption Capacity* |
|---|---|---|---|---|---|
| 0 | 0.067 | 182.5 | 33.9 | 1.0 | 83.0 |
| 75 | 0.077 | 140.6 | 36.6 | 0.5 | 84.8 |
| 150 | 0.071 | 149.8 | 39.8 | 0.8 | 83.0 |
| 300 | 0.293 | 47.0 | 34.0 | 1.5–2.0 | 58.3 |
| 800 | 0.440 | — | 10.0 | 3.0–5.0 | 37.7 |

*Percent Silicone Oil

TABLE II

| Stirring Speed RPM | Adsorption Capacity % | | | |
|---|---|---|---|---|
| | Water | Mineral Oil | Glycerine | Organic Ester* |
| 0 | 0 | 80 | 75 | 80 |
| 75 | 0 | 83.9 | 75 | 81.5 |
| 150 | 0 | 80 | 75 | 80 |
| 300 | 0 | 54.5 | 58.3 | 54.5 |

*2-ethylhexyl-oxystearate

TABLE III

| RPM | Adsorption Capacity % | | | Density (g/cm³) | |
|---|---|---|---|---|---|
| | Mineral Oil | 2-ethylhexyl oxystearate | Silicone Oil | Bulk | Tapped |
| 0 | 82.5 | 82.5 | 86.5 | 0.0368 | 0.0580 |
| 75 | 82.3 | 82.2 | 86.5 | 0.0462 | 0.0667 |
| 150 | 82.3 | 82.3 | 86.3 | 0.0527 | 0.0737 |
| 200 | 81.5 | 81.5 | 85.7 | 0.0554 | 0.0752 |
| 250 | 79.2 | 80.0 | 84.8 | 0.0636 | 0.0859 |
| 300 | 68.8 | 68.8 | 75.0 | 0.1300 | 0.1768 |
| 450 | 58.3 | 58.3 | 61.5 | 0.1736 | 0.2392 |
| 600 | 54.5 | 54.5 | 60 | 0.1933 | 0.2792 |
| 700 | 42.2 | 42.5 | 45.7 | 0.2778 | 0.4142 |
| 800 | 33.3 | 28.6 | 33.3 | 0.3862 | 0.5322 |
| 1000 | 32.8 | 28.5 | 32.9 | 0.3808 | 0.5261 |

In the foregoing tables, it can be seen that adsorption and density, as a function of stirring rate, was determined for several fluids including a silicone oil, water, mineral oil, glycerine, and an organic ester. From zero rpm up to about 250 rpm, the adsorptivity of the porous copolymeric powder particulates of Example I remained essentially consistent. However, at about three hundred rpm, there was a substantial decrease in adsorptivity, which decrease became more apparent as the stirring rate was increased up to about one thousand rpm. A similar pattern is evidenced by the data which are reflective of the density.

This phenomenon is more apparent in the photomicrographic figures of the drawing. Thus, it can be seen from FIG. 6, that the particle size of the unit particles increases as the stirring rate is increased, as evidenced by FIG. 10. A progression in this phenomenon can be observed in FIGS. 7–9.

While the procedure of Example I is a precipitation polymerization process and not a suspension polymerization system, the prior art dealing with both "in situ" and "post adsorbed" categories of suspension polymerization processes, teaches that an increase in stirring rate causes a decrease in particle size. This is documented, for example, in U.S. Pat. No. 4,224,415, issued Sep. 23, 1980, and in the PCT International Publication. The PCT International Publication employs stirring rates upwards of nine hundred to twelve hundred rpm. In Example I of the present invention, however, increases in stirring rates not only do not decrease the particle size, but in fact have exactly the opposite effect, causing the unit particle size to increase. As the rate of stirring is increased from zero rpm up to one thousand, the density of the particles increases and the adsorptive capacity decreases.

In accordance with the above, it should be apparent that it is possible to tailor porous adsorbent powders of a particular particle size and adsorptivity by means of stirring rate. Thus, with large unit particles in FIG. 10, the adsorptive capacity is less than the adsorptive capacity of smaller sized unit particles in FIGS. 6–9. While the most effective particles are produced when the rate of stirring is maintained below about three hundred rpm, particles produced at rates beyond three hundred rpm are useful.

Figure 1:
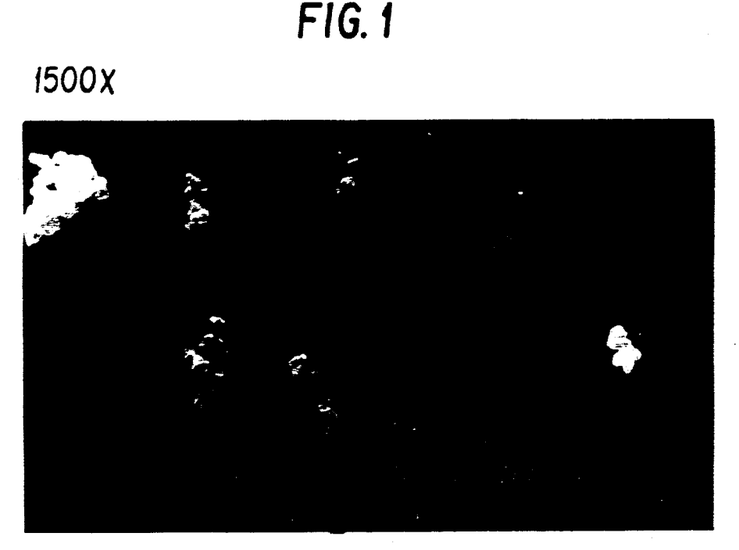
FIG. 1 is a photomicrograph of the various components of the complex structure of the powder produced in Example I, and including unit particles, agglomeratures, and aggregates.
Figure 2:
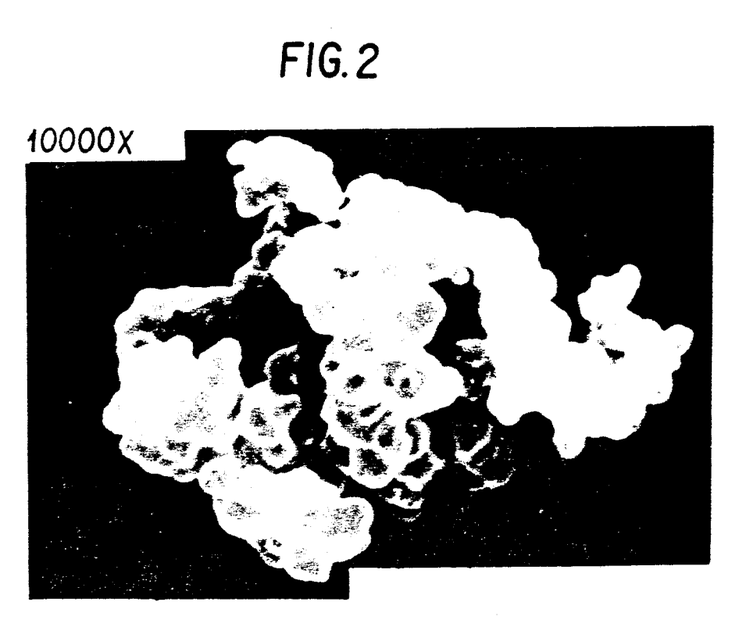
FIGS. 2 and 3 are photomicrographs of the agglomerates and aggregates of FIG. 1, respectively, shown on a larger scale.
Figure 3:
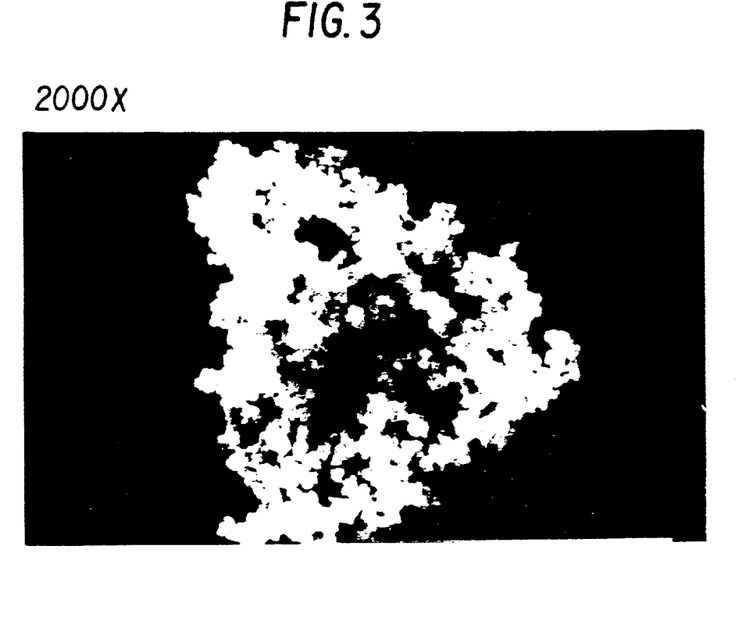
Figure 4:
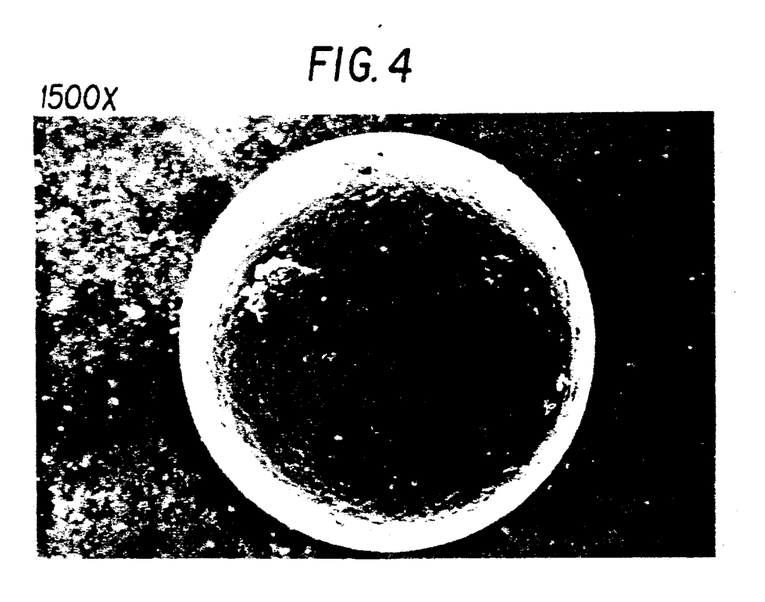
FIG. 4 is a photomicrograph of a polymer bead produced by suspension polymerization.
Figure 5:
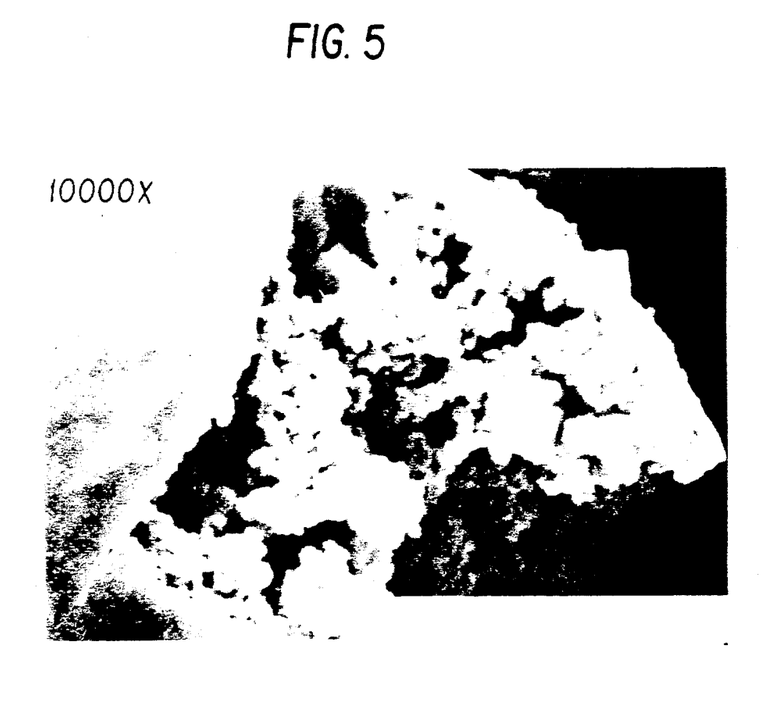
FIG. 5 is a photomicrograph of the bead of FIG. 4 with a portion of the shell removed to reveal the interior structure of the bead.
Figure 6:
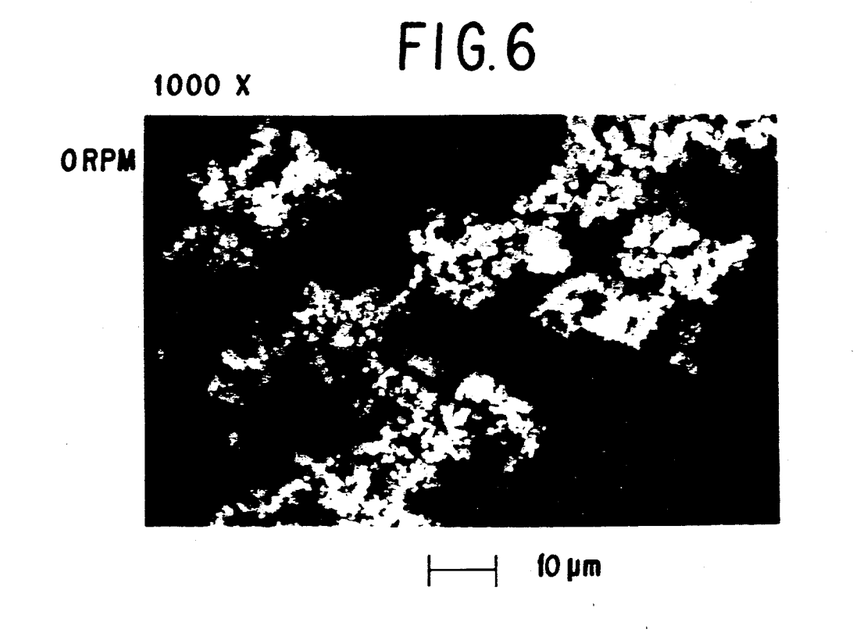
FIG. 6 is a photomicrograph of a hydrophobic copolymeric powder material. The powder is shown in magnification as it appears when the agitation rate employed in the process for producing the hydrophobic powder is zero rpm.
Figure 7:
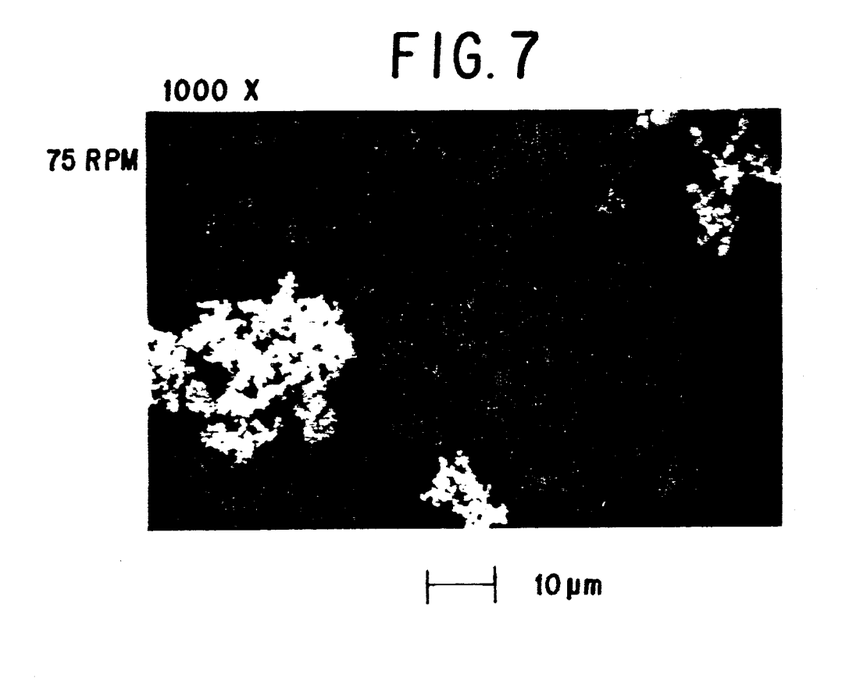
FIGS. 7-10 are additional photomicrographs of hydrophobic copolymeric powder materials. The powder is shown in magnification as it appears when the agitation rate employed in the process for producing the hydrophobic powder varies from seventy-five rpm up to eight hundred rpm.
Figure 8:
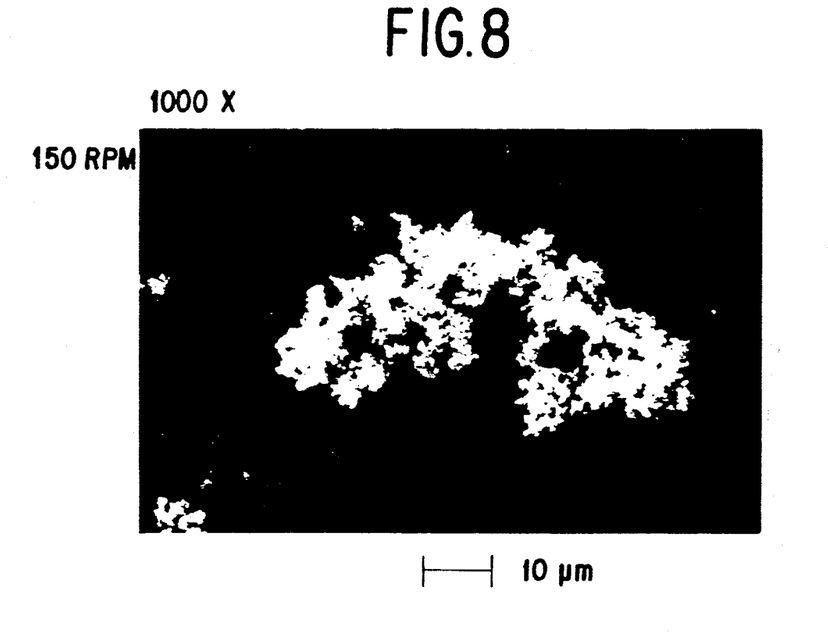
Figure 9:
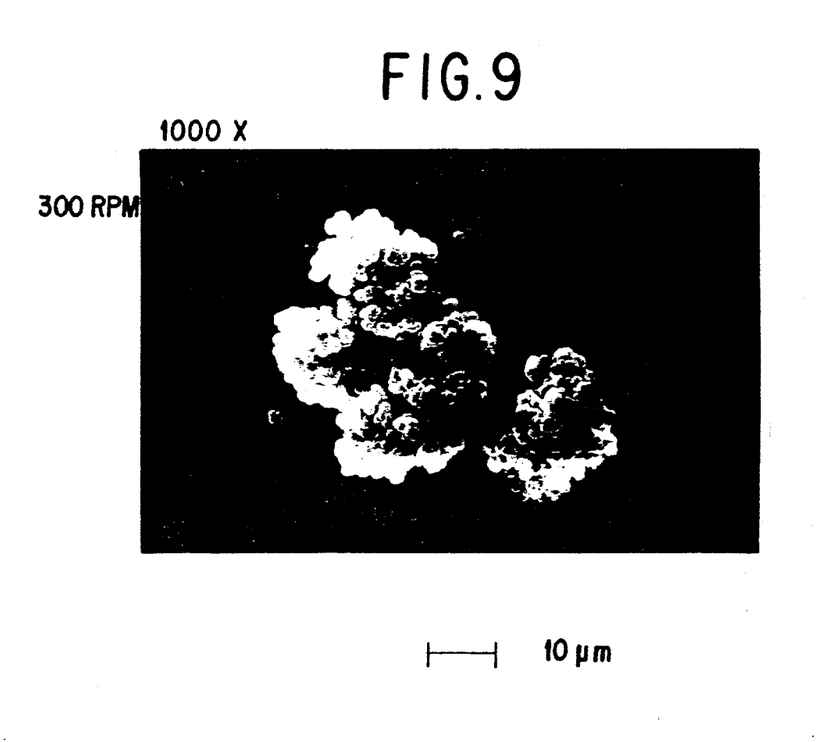
Figure 10:
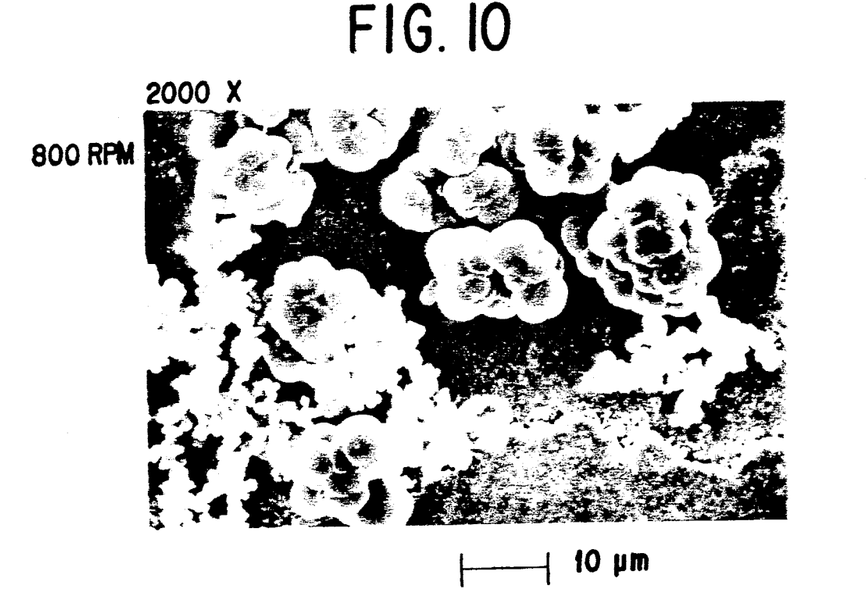

It is important to understand that the method of Example I for the production of hydrophobic porous copolymeric particulate powder materials is characterized as a precipitation polymerization technique. In accordance with this technique, monomers are dissolved in a compatible volatile solvent in which both monomers are soluble. Polymer in the form of a powder is precipitated and the polymer is insoluble in the solvent. No surfactant or dispersing aid is required. The materials produced are powders and not spheres or beads. The powder particulates include unit particles, agglomerates, and aggregates. The volatile solvent is subsequently removed resulting in a dry powder, which can be post adsorbed with a variety of functional active ingredients. The suspension polymerization process on the other hand, provides that polymerization be carried out in water, and in some cases chloroform or chlorinated solvents. The monomers, the active, and the catalyst, form beads or droplets in water, and polymerization occurs within each bead. A surfactant or stabilizer, such as polyvinyl pyrrolidone, is required in order to prevent the individually formed beads and droplets from coalescing. The resulting beads, with the active material entrapped therein, include a substantially spherical outer crust or shell, the interior of which contains a macroporous structure of fused unit particles, agglomerates, and aggregates. The bead is ten microns in diameter to one hundred-fifty microns, depending upon the rate of agitation employed during the process. Such beads are shown in FIGS. 4 and 5.

Some unique features of the powders of Example I and FIGS. 1-3 and 6-10 are their ability to adsorb from sixty to eighty percent of a liquid and yet remain free flowing. The materials provide a regulated release of volatile ingredients such as cyclomethicone entrapped therein, and have the capability of functioning as carriers for other non-volatile oils. Loaded powders disappear when rubbed upon a surface. This phenomenon is believed due to the fact that large aggregates of the material scatter light rendering the appearance of a white particulate, however, upon rubbing, these large aggregates decrease in size approaching the range of visible light and hence seem to disappear. The materials find applications in diverse areas such as cosmetics and toiletries, household and industrial products, pesticides, pheromone carriers, and pharmaceuticals. The materials do not swell in common solvents and are capable of physically adsorbing active ingredients by the filling of interstitial voids by capillary action. The active ingredients are subsequently released by capillary action or wicking from the voids within the particulates.

In Examples II-IV, the hydrophobic powder material produced in Example I, was surface treated in order to render the hydrophobic powder more hydrophilic. A first method is shown in Example II. A second method is set forth in Example III. Example IV describes an additional step that may be included in the method of Example III. References to hydrophobic powder in Examples II-IV refers to the powder material produced in accordance with Example I.

EXAMPLE II 5.0 grams of hydrophobic powder was refluxed and stirred with 10.0 grams of NaOH, 150 cc of butyl alcohol, and 15 cc of water. After reflux for 4.5 hours, the product was filtered and washed four times with 100 cc of 1:1 isopropyl alcohol and water, once with butyl alcohol, and once again with isopropyl alcohol. The powder was vacuum dried to constant weight. Scanning electron microscopic photomicrographs of the treated powder showed no visible change in aggregate structure compared to untreated powder. Electron spectroscopic analysis (ESCA) showed 6 atom % Na at the surface of the powder. Attentuated total reflectance infrared radiation analysis indicated the presence of carboxylate ion (1590 cm-1) in the treated powder. The treated powder was easily wetted by water and produced a viscous paste upon minimal mixing. By comparison, untreated powder was completely non-wetted by water.

EXAMPLE III 2.5 grams of methacrylic acid was added to 25.0 grams of hydrophobic powder that had been suspended in a mixture of 100 cc toluene, 400 cc heptane, and 0.275 grams 1,1'-azobiscyclohexanecarbonitrile. The mixture was flushed with $N_2$ and heated at reflux (104° C.) for 4 hours. The product was filtered, washed with isopropyl alcohol, and dried under vacuum to a constant weight. Scanning electron microscopic photomicrographs of the powder showed no apparent change in aggregate structure. Electron spectroscopic analysis (ESCA) showed an enrichment of oxygen (26.4 atom % O) at the surface of the powder compared to untreated powder (20.0 atom % O). The product was wettable by water.

EXAMPLE IV 5.0 grams of product from Example III was mixed with 2.0 grams NaOH dissolved in a mixture of 200 cc isopropyl alcohol and 50 cc water. The mixture was stirred for 10 minutes at 65° C. The powder was recovered by filtration, washed twice with 300 cc 1:1 isopropyl alcohol $H_2O$, and dried under vacuum to a constant weight. Electron spectroscopic analysis (ESCA) showed the presence of 3.4 atom % Na on the surface of the powder. The powder was highly adsorbent toward water.

Test data showing the hydrophilic nature of the materials produced by the methods of Examples II-IV are set forth in Table IV. It should be apparent from Table IV that the powder materials produced by both the method of Example II and the method of Examples III-IV are capable of adsorbing water, in contrast to the hydrophobic powder of Example I. In fact, Table II shows that the hydrophobic powders produced by Example I did not adsorb water to any extent.

In Example II, the powder of Example I was saponified by reacting the surface with an aqueous alkali, rendering the hydrophobic nature of the powder surface after saponification to be more hydrophilic. Potassium hydroxide and quaternary ammonium hydroxides may also be employed. In Example III, alteration of the surface characteristics of the powder was achieved by polymerizing an acrylate monomer on the surface of the hydrophobic powder in order to form hydrophilic carboxylic acid sites thereon. Another suitable monomer is acrylic acid. The carboxylic acid sites may be further converted to more hydrophilic carboxylate anions in Example IV, by reacting the powder surface containing the carboxylic acid sites with aqueous alkali.

Free flowing adsorption capacity of the surface modified powders of Examples II-IV was determined by addition of incremental amounts of liquid to a known amount of powder, using gentle mixing, until the powder was no longer free flowing. The capacity is shown in Table IV and was expressed as:

$$\frac{(\text{wt. Powder} + \text{Liquid}) - (\text{Initial wt. of Powder})}{(\text{wt. Powder} + \text{Liquid})} \times 100$$

TABLE IV

Maximum Free Flowing Adsorption Capacity (%)

| Sample | $H_2O$ | Mineral Oil | Ester* | Silicone** |
|---|---|---|---|---|
| Untreated Powder Control of Example I | 0 | 77.3 | 78.3 | 78.3 |
| Powder of Example II Saponified With NaOH | 69.8 | 50.4 | 51.2 | 56.0 |
| Powder of Example III | 74.5 | 75.6 | 72.3 | 76.9 |
| Powder of Example IV | 73.0 | 72.3 | 73.0 | 76.2 |

*2-ethylhexyl oxstearate
**Octamethylcyclotetrasiloxane

EXAMPLE V

Example I was repeated, except that different monomer systems were employed and at varying mol ratios of the monomers. The copolymeric powders produced were tested for their adsorptive capacity for various lipophilic fluids and for water. The monomer pairs employed, the mol ratios, and the adsorption data generated for each monomer pair, are shown in Table V. It will be noted that the powders produced from the monomer pairs of Example V not only were capable of adsorbing substantial quantities of lipophilic fluids, but that water was capable of being adsorbed. This is in contrast to Example I and Table II where no water was adsorbed.

Example V sets forth the concept of the providing hydrophilic-lipophilic copolymeric powders capable of adsorbing water and lipophilic fluids. By a careful selection of monomers, there can be produced adsorbent powder possessing more versatility than the hydrophobic powder of Example I. In addition, the method of Example V is a viable alternative to the surface treatment methods of Examples II-IV, and provides powder materials of substantially equivalent utility.

The water adsorbing porous polymeric materials of Examples II-V are to be contrasted with the water containing beads of U.S. Pat. No. 3,627,708, issued Dec. 14, 1971. The bead of the '708 patent is produced by "in situ" suspension polymerization, and is adapted to contain water only because of the presence of a solubilizer such as sodium bis(2-ethyl hexyl) sulfosuccinate. The material of Examples II-V, on the other hand, is produced by a precipitation polymerization process, which contains no solubilizer, and produces a material in the form of a powder consisting of unit particles, agglomerates, and aggregates. Thus, these materials are very distinct from the materials of the '708 patent.

In order to demonstrate the use of the powder material of Example I as an adsorbent for the decontamination of toxic chemical agents, two simulated toxic chemical agents were employed. The first simulated toxic chemical agent was dimethyl methyl phosphonate (DMMP) or $CH_3P(O)(OCH_3)_2$, and the second simulated toxic chemical agent was methyl salicylate (MS) or $C_6H_4OHCOOCH_3$. Both simulated chemical agents possess physical properties resembling most toxic chemical agents, and MS in particular, has properties much the same as mustard blister agents. The simulated chemical agents DMMP and MS were thickened to further assimilate the viscous nature of toxic chemical agents by employing four percent by weight of polymethylmethacrylate polymer powder K-125 manufactured by Rohm and Haas Company, Philadelphia, Pa.

The function of the copolymeric porous powder of Example I is twofold. The first function of the dry empty powder is to directly adsorb toxic chemical agents when it is applied to such surfaces as skin, clothing, and equipment; and to thereby physically remove the toxic chemical agent from the surface which is contaminated. The second function of the copolymeric porous powder of Example I is to function as a carrier and delivery mechanism for a decontaminating agent. In the second function, the decontaminating agent is post adsorbed onto the powder of Example I. The loaded or post adsorbed powder is brought into direct contact with a surface contaminated with a toxic chemical agent. Upon adsorbing the toxic chemical agent, the decontaminating material reacts with and neutralizes or renders ineffective the toxic chemical agent present on the surface. Both functions of the copolymeric porous powder of Example I are shown below in Example VI and in Example VII.

EXAMPLE VI

A twenty-five percent sodium hydroxide solution was used as the decontaminating agent. With the aid of a wetting agent, it was determined that up to sixty-six

TABLE V

| Monomers | Mole Ratio | Absorption Percent | | | |
|---|---|---|---|---|---|
| | | 2-Ethylhexyl Oxystearate | Mineral Oil | Glycerine | Water |
| Vinyl pyrrolidone*/Ethylene glycol dimethacrylate** | 20/80 | 77 | 74 | 80 | 70 |
| Diacetone acrylamide*/Ethylene glycol dimethacrylate** | 20/80 | 68 | 75 | 73 | 75 |
| Diacetone acrylamide*/Ethylene glycol dimethacrylate** | 30/70 | 68 | 66 | 73 | 72 |
| 2 Phenoxyethyl methacrylate**/ Tetraethylene glycol dimethacrylate* | 40/60 | 68 | 64 | 72 | 68 |
| 2 Phenoxyethyl methacrylate**/ Tetraethylene glycol dimethyacrylate* | 50/50 | 60 | 60 | 70 | 70 |

*Hydrophilic
**Lipophilic percent by weight of the decontaminating agent could be post adsorbed on the powder of Example I. The wetting agent employed was an amphoteric surfactant. The surfactant was a substituted imidazoline manufactured by Mona Industries, Inc., Paterson, N.J., and sold under the trademark MONATERICS®. Each of MONATERICS® 811, 985A, and 1000, were adequate in aiding the adsorption of the twenty-five percent sodium hydroxide decontaminating agent on the powder of Example I, to levels approaching sixty-six percent by weight based on the total weight of the post adsorbed powder. As an alternative to the use of a wetting agent, the surface treated powders of Examples II-IV could be employed, as well as the specialty powders of Example V, any of which are more hydrophilic than the hydrophobic powder of Example I. In any event, a fifty percent loading of the twenty-five percent sodium hydroxide decontaminating agent on the powder of Example I was selected, and a post adsorbed powder containing the decontaminating agent was prepared using each of the three Monateric® surfactants. These preloaded post adsorbed powders still adsorbed up to a loading of 75% of either MS or DMMP.

The decontaminating powder was evaluated along with six other conventional powder materials and the capacity of the seven powders for adsorbing DMMP and MS was determined. The results for the adsorption of DMMP are tabulated in Table VI which indicates that the performance of the post adsorbed powder of Example I exceeded the performance of the other six powder materials. The percentages indicated in Table VI are based on the weight of the powder in each instance. Table VII shows the time required for a predetermined quantity of each of the seven powders of Table VI to adsorb a predetermined quantity of DMMP.

EXAMPLE VII

The empty powder of Example I was sprinkled on glass plates each containing the thickened simulated chemical agents DMMP and MS. The powder and the simulated chemical agent were not further mixed or intermingled. After allowing a brief time for the powder to adsorb the simulated chemical agent, a compressed air stream was directed at each of the plates. In each case, the thickened simulated chemical agent was removed from the glass plate, indicating the ability of the powder of Example I to physically decontaminate surfaces. Similar results were obtained on metal and on painted metal surfaces.

TABLE VI

ADSORPTION CAPACITY FOR DMMP[a]

| Adsorbent | | % Free Flowing[b] | % Total |
|---|---|---|---|
| A. | Powder of Example I | 83.3 | 89.8 |
| B. | Polymeric Powder of Methacryloxypropyl Trimethoxy Silane | 78.3 | 86.5 |
| C. | Acetic Acid Treated Powder of B | 82.8 | 87.1 |
| D | Methacrylate Polymeric Powder | 77.3 | 84.5 |
| E. | Activated Carbon | 54.6 | 69.9 |
| F. | Fuller's Earth (RVM) | 56.5 | 68.3 |
| G. | Fuller's Earth (LVM) | 54.5 | 66.5 |

[a]Dimethyl Methyl Phosphonate
[b]Amount adsorbed to maintain free flowing character of adsorbent particulate

TABLE VII

ADSORPTION RATE OF DMMP[a]

| Adsorbent | | g Adsorbent | g Agent[a] | Time to Capillary Elevation of 72 MM (hrs.-min.) |
|---|---|---|---|---|
| A. | Powder of Example I | 0.1525 | 1.3482 | 2-10 |
| B. | Polymeric Powder of Methacryloxypropyl Trimethoxy Silane | 0.1509 | 0.9661 | 1-10 |
| C. | Acetic Acid Treated Powder of B | 0.0822 | 0.5529 | 1-50 |
| D. | Methacrylate Polymeric Powder | 0.2290 | 1.2477 | 4-5 |
| E. | Activated Carbon | 0.4614 | 1.0690 | 4-30 |
| F. | Fuller's Earth (RVM) | 0.3052 | 0.6586 | 4-50 |
| G. | Fuller's Earth (LVM) | 0.3695 | 0.7335 | 5-10 |

[a]Dimethyl Methyl Phosphonate

In light of Examples VI-VII and Tables VI-VII, it is believed that the powder materials of the present are of general utility as decontaminating agents, and would be effective against most toxic chemical agents. Representative of toxic chemical agents which could be neutralized are choking agents such as phosgene, diphosgene, and chlorine; blood agents such as hydrogen cyanide, cyanogen chloride, and arsine; vomiting agents such as Adamsite and diphenylchloroarsine; nerve agents such as Tabun which is ethyl phosphoro-dimethylamidocyanidate, Sarin which is isopropyl methylphosphonofluoridate, Soman which is pinacolyl methylphosphonofluoridate, and V-agents such as VX; blister agents such as distilled mustard, nitrogen mustards, Lewisite, and arsine derivatives; tear agents; and incapacitating agents such as BZ which is 3-quinuclidinyl benzilate. The adsorbent copolymeric powder of the present invention can be used to decontaminate such toxic chemical agents occurring on most surfaces including, for example, masks, clothing, gloves, boots, skin, shelters, hardware, equipment, and building interiors.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. An adsorbent for decontaminating toxic chemical agents comprising a macroporous cross-linked hydrophobic copolymer produced by precipitation polymerization in a solvent of monomers soluble therein, the copolymer being in the form of a powder, the powder being a combined system of particles, the system of powder particles including unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter, and a decontaminating agent for neutralizing toxic chemical agents being entrapped within the powder, the powder having interstitial voids which are filled with the decontaminating agent by capillary action and which decontaminating agent is released from the interstitial voids of the powder by capillary action and wicking.

2. The adsorbent of claim 1 wherein the decontaminating agent is a chemical neutralizer selected from the group consisting of sodium hydroxide, lithium hydroxide, concentrated bleach and a mixture of diethylene triamine, 2-methoxy ethanol and sodium hydroxide.

3. The adsorbent of claim 2 wherein one monomer of the copolymer is lauryl methacrylate.

4. The adsorbent of claim 3 wherein one monomer of the copolymer is ethylene glycol dimethacrylate.

5. The adsorbent of claim 2 wherein the copolymer is formed of polyunsaturated monomers.

* * * * *